C. W. EBELING.
DREDGER FOR PULVERULENT MATERIAL.
APPLICATION FILED APR. 6, 1911.
1,034,598.
Patented Aug. 6, 1912.
3 SHEETS—SHEET 2.
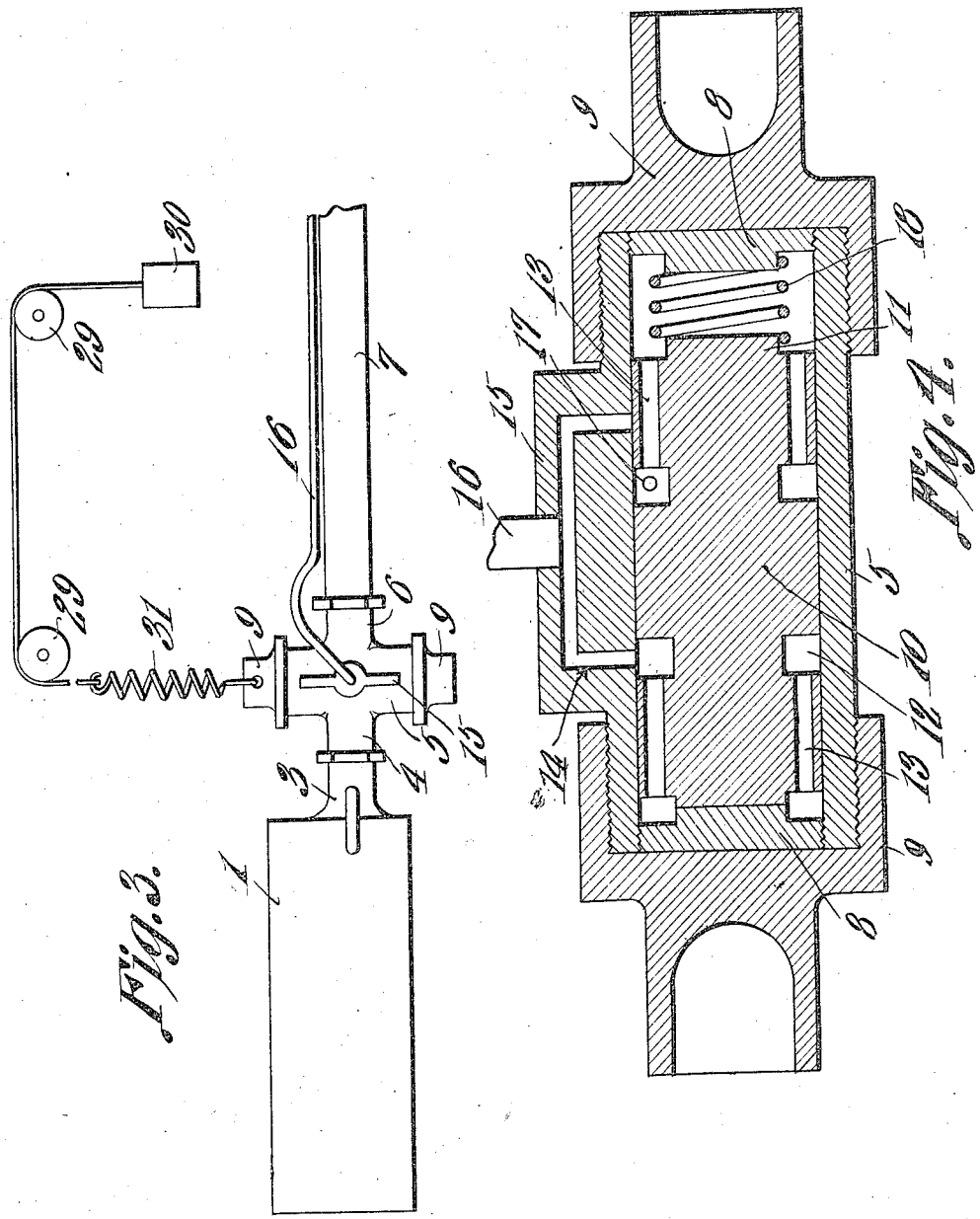
Charles W. Ebeling,
Inventor
Witnesses
by
Attorneys

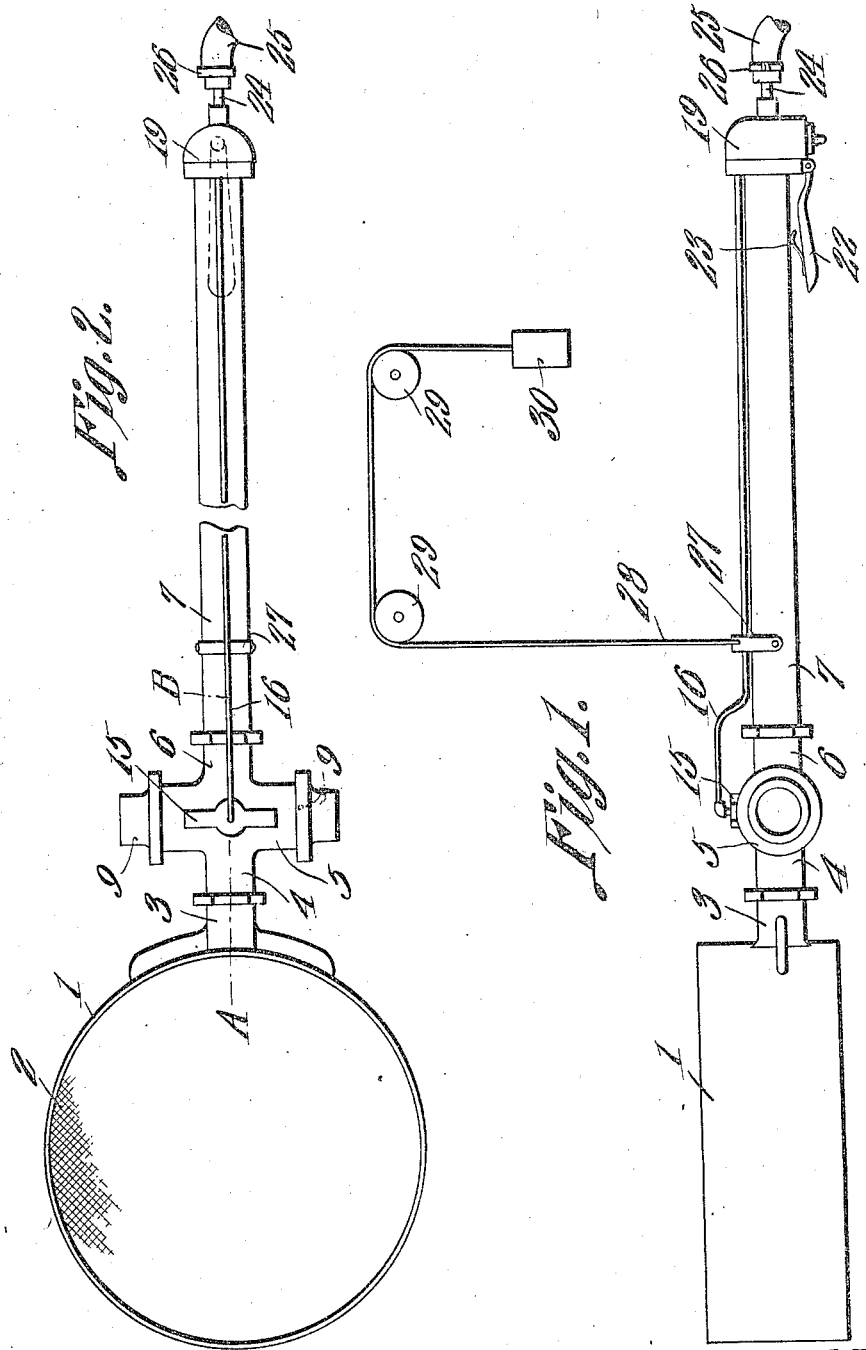

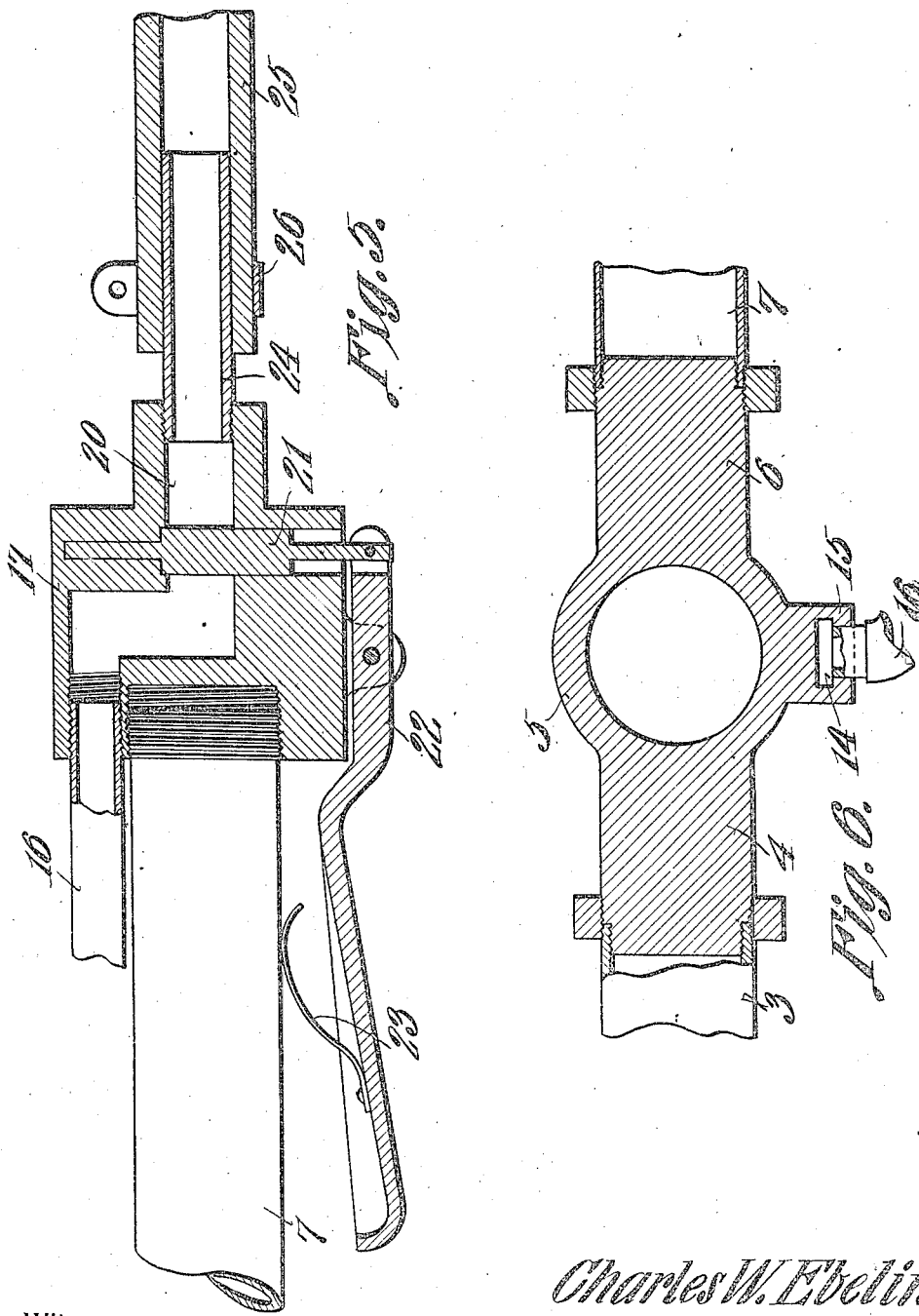

UNITED STATES PATENT OFFICE.

CHARLES W. EBELING, OF ELM GROVE, WEST VIRGINIA.

DREDGER FOR PULVERULENT MATERIAL.

1,034,598.

Specification of Letters Patent. Patented Aug. 6, 1912.

Application filed April 6, 1911. Serial No. 619,377.

*To all whom it may concern:*

Be it known that I, CHARLES W. EBELING, a citizen of the United States, residing at Elm Grove, in the county of Ohio and State of West Virginia, have invented a new and useful Dredger for Pulverulent Material, of which the following is a specification.

This invention relates to dredgers for distributing pulverulent material, such as powdered enamel used in the manufacture of bath tubs and other enameled structures.

One of the objects of the present invention is to provide a vibrator located close to the sieve of the dredger and mounted to reciprocate along a line intersecting the longitudinal axis of the handle, there being anvils in the path of the vibrator and which are designed to be successively struck by said vibrator which, when reciprocated at a high speed strikes the anvils in rapid succession, thus vibrating the sieve to such an extent as to insure uniform discharge of pulverulent material irrespective of the manner in which the dredger may be held. Both hands of the operator are thus free to handle the device and the operation of distributing the material can thus be more quickly and accurately carried on than by any of the methods heretofore devised.

With the foregoing and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings the preferred form of the invention has been shown.

In said drawings:—Figure 1 is a side elevation of the dredger. Fig. 2 is a plan view thereof the supporting member being removed. Fig. 3 is a side elevation of a portion of the dredger with the vibrator arranged in a different position relative to the handle. Fig. 4 is an enlarged longitudinal section through the vibrator and its casing. Fig. 5 is an enlarged section through the controlling valve and adjacent parts. Fig. 6 is an enlarged section on the line A—B Fig. 2.

Referring to the figures by characters of reference 1 designates a pulverulent container the bottom of which is formed of wire gauze of fine mesh, as indicated at 2 in Fig. 2. This container has a stem 3 engaging an arm 4 which projects from the casing 5 of the vibrator, there being another arm 6 extending from said casing and connected to the handle 7 of the dredger, this handle being either solid or tubular as preferred. Casing 5 has its ends closed by anvil blocks 8 preferably formed of hardened metal and caps 9 are screwed onto the ends of the casing and constitute abutments for the anvil blocks. The vibrator 10 is preferably cylindrical and fits snugly within the casing 5, this block having reduced end portions 11 designed to strike the respective anvil blocks. Moreover annular grooves 12 are formed within the block at opposite sides of the center thereof and communicate, through ports 13, with the interior of the respective end portions of the casing 5. Channels 12 are designed to alternately register with inlet ports 14 formed within an enlargement 15 on the casing 5 and these ports communicate with a supply pipe 16. Exhaust ports 17 are formed within the casing and are so arranged that, when one of the grooves 12 is registering with one of the inlet ports 14, the other groove is registering with one of the exhaust ports. A light spring 18 is preferably interposed between one end of the vibrator and one end of the casing so as to positively prevent said vibrator from stopping at a dead center.

The supply pipe 16 is extended along the handle 7 and opens into a valve casing 19 secured to one end of the handle. The passage 20 within this valve casing is adapted to be closed by a slide valve 21 one end of which is pivotally connected to a controlling lever 22 connected to the casing 19 and held normally in position with valve 21 closed, by a spring 23. A nipple 24 projects from one end of the passage 20 and a flexible hose 25 is adapted to be secured thereto by a clip 26 or the like.

A yoke 27 may be connected to the handle, this yoke being engaged by a supporting cord 28 extending upwardly from the dredger and mounted on guide sheaves 29, said cord carrying, at its free end, a counterbalance 30. The said cord is preferably formed with an elastic portion 31 which may be a metal spring, a rubber cord, or the like.

In the structure shown in Fig. 1, the vibrator is movable in a plane parallel with the bottom of the container 1 but it is to be understood that said vibrator can be caused to reciprocate in any direction provided its path of movement is along a line intersecting the longitudinal axis of the handle 7. For example, and as shown in Fig. 3, the said vibrator may be so mounted as to reciprocate along a line extending perpendicularly to the plane occupied by the bottom of the container.

In using the dredger the same is suspended by the counter-balanced supporting structure, above the object to be enameled and the container 1 is then partly or entirely filled with the pulverulent material. The flexible hose 25 is connected to a reservoir containing air under pressure or to a suitable air forcing means. The operator grasps the handle 7 close to the valve casing 19 and after he has brought the container to proper position, he swings the lever 22 so as to open valve 21. Air immediately passes through the valve casing to pipe 16 and thence to the ports 14. The air first enters one of the grooves 12 in the vibrator and is then directed through the adjacent end of said vibrator and into the space between the vibrator and one end of the casing, thus shifting the vibrator violently against the anvil block at the other end of the casing. The direction of the air is then promptly reversed so as to drive the vibrator in the opposite direction and a rapid reciprocation of the vibrator is thus set up, said vibrator hitting the anvil blocks violently upon the completion of its successive strokes and this hitting resulting in a practically continuous vibration or jarring of the container 1. As the line of force extends transversely of the handle, it will be apparent that none of the vibrations will be absorbed by the hand or hands of the operator grasping the handle.

It will be obvious that spring 31 is not necessary unless the vibrator reciprocates vertically, as in Fig. 3, in which event it is necessary to have a yielding support to permit downward movement of the container and vibrator casing under the impact of the down strokes of the vibrator.

As soon as the lever 22 is released by the operator, spring 23 shifts it automatically so as to close the valve 21 and thus shut off the supply of air to the vibrator casing. The operation of the vibrator will promptly cease.

Although air under pressure can be used as a medium for actuating the vibrator, it is to be understood that steam, water or the like may be employed equally as well and, with some modifications of structure, said vibrator can be operated electrically.

What is claimed is:—

1. A dredger including a sifter, a handle extending therefrom, and a vibrator housed within the handle and mounted for movement across the longitudinal axis of the handle.

2. A dredger including a sifter, a handle, a vibrator casing upon the handle, a vibrator mounted to reciprocate within the casing and across the longitudinal axis of the handle, and separate spaced means in the path of the vibrator for receiving successively the impact therefrom upon the completion of the successive movements of the vibrator.

3. A dredger including a sifter, a handle extending therefrom, a casing carried by the handle, spaced anvils in the casing and a vibrator mounted to reciprocate within the casing and in a path intersecting the handle, said vibrator being movable successively into contact with the respective anvils during its reciprocation.

4. A dredger including a sifter, a handle, a casing intersecting the handle, a power driven vibrator mounted for reciprocation within the casing, means for controlling the operation of the vibrator, and separate means at opposite sides of the path of the vibrator for receiving the impact therefrom upon the completion of the successive strokes of the vibrator.

5. A dredger including a sifter, a handle, a casing carried by the handle, and power propelled means mounted within the handle for automatically jolting the casing and handle along lines intersecting the longitudinal axis of the handle upon the completion of each movement of said means.

6. A dredger including a sifter, a casing connected thereto, anvil blocks mounted within the ends of the casing, a vibrator mounted to reciprocate within the casing and to successively strike the anvils, and means for reciprocating the vibrator, along a path intersecting the longitudinal axis of the handle.

In testimony that I claim the foregoing as my own, I have hereto affixed my signature in the presence of two witnesses.

CHAS. W. EBELING.

Witnesses:
  CHAS. SEIBERT,
  D. R. BENTLEY.